United States Patent

[11] 3,620,606

[72] Inventor Hubert F. A. Tschunko
 Milton, Mass.
[21] Appl. No. 36,819
[22] Filed May 13, 1970
[45] Patented Nov. 16, 1971
[73] Assignee The United States of America as
 represented by the Administrator of the
 National Aeronautics and Space
 Administration
 Continuation-in-part of application Ser. No.
 712,100, Mar. 11, 1968, now abandoned.
 This application May 13, 1970, Ser. No.
 36,819

[54] OPTICAL SYSTEM SUPPORT APPARATUS
 10 Claims, 11 Drawing Figs.
[52] U.S. Cl. ........................................... 350/310
[51] Int. Cl. ........................................... G02b 5/08
[50] Field of Search ............................... 350/288,
 293, 295, 200, 310; 356/109

[56] References Cited
 UNITED STATES PATENTS
 2,152,394 3/1939 Veeder ..................... 350/310
 2,693,065 11/1954 Zobel et al. ............... 356/109
 2,988,959 6/1961 Pelkey et al. .............. 350/310
 3,453,041 7/1969 Rantsch ................... 350/310
 FOREIGN PATENTS
 309,236 4/1929 Great Britain ............. 350/310
Primary Examiner—David Schonberg
Assistant Examiner—Michael James Tokar
Attorneys—Herbert E. Farmer and John R. Manning ABSTRACT: An optical mirror support system is disclosed having a mirror supported by a plurality of supporting elements arranged along discrete contact regions so as to deform the mirror reflective surface in a manner producing a deformation pattern which qualitatively causes a diffraction pattern by the optical aperture having an idealized or optimized image quality. A preferred or optimized ratio of the distances between adjacent families of support elements and the distance between adjacent support elements of the same family, has been found.

PATENTED NOV 16 1971     3,620,606

Inventor:
Hubert F. A. Tschunko,
by    *signature*    Attorney

OPTICAL SYSTEM SUPPORT APPARATUS

This application is a continuation-in-part of Ser. No. 712,100, filed Mar. 11, 1968, now abandoned.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to an optical mirror support system and, more particularly, relates to an optical mirror support system for deflecting light beams and/or for producing images of objects.

There exist many applications requiring the improvement of the image elements in an optical system. In systems such as an optical plane mirror for deflecting a light beam, each optical imaging mirror system functioning as a receiver of radiation from a distant target to produce images of the targets, or each optical imaging system functioning as a transmitter of radiation to a distant target, must direct the light beams as precisely as possible so as to avoid additional aberrations of the light beams. Such impairments are produced by deflections of the reflecting mirror surfaces, which deflections in turn are caused by imperfect support systems of the mirror.

The quality of these optical systems becomes obvious in the light distribution within the image of a pointlike light source, within an image element. All images are composed of image elements. The image elements represent patterns caused by diffraction effects, by the wave nature of the light radiation. Imperfections and mirror deflections distort these patterns. This problem is particularly acute in the field of astronomical telescopes which utilize relatively thin, large diameter, reflection mirrors that may have diameter to thickness ratios of 6 to more than 100. With mirrors of this type, deflection of the reflective surface is produced by the mirror supports themselves thereby introducing distortion into the reflected image. Although various types of mirror support systems have been developed in an attempt to alleviate this problem, no such system has been totally satisfactory and the problem of image distortion persists.

Previous efforts have been made to provide mirror support systems. For example, hexagonal and rectangular arrangements of support points or support regions have been described. A hexagonal arrangement of support points is described in the book entitled, "Telescopes" edited by Gerard Kuiper et al., published by the University of Chicago Press, 1960. A rectangular arrangement of support points has been described in the book entitled, "Amateur Telescope Making," Book One edited by A. G. Ingalls, published by Scientific American Incorporated, 1966. In addition, the U.S. Pat. to Zobel and Mirus No. 2,693,065, illustrates a rectangular arrangement of support points. A circular arrangement is shown in British Pat. No. 309,236 to Parsons; however, the support elements of Parsons are uniformly distributed. Various diffraction patterns are shown in "Die Fernrohre und Entfernungsmesser" by Konig and Kohler, 1959, at page 318. Attention is also directed to "Technologie Der Astornomischen Optik" by D. D. Maksutov, 1954, at page 61, which illustrates three support elements and a degraded diffraction pattern. In the 1970 Encyclopaedia Britannica Book of the Year, there is shown on page 124 the supports for a reflector mirror of a 236.22-inch telescope. However, these prior art support systems cause a hexagonal, rectangular or irregular deterioration of the diffraction image, thereby degrading the imaging quality.

An object of this invention, therefore, is to provide an optical mirror support system having a reflecting mirror support system which optimizes the image quality of light diffraction patterns.

An important property of a diffraction pattern is its symmetry about a center point and its high concentration of energy in the most central spot. Typically, a pattern consists of a central portion of symmetrically surrounding outer portions which decrease in intensity. The particular form of the pattern depends upon the configuration and transmission distribution of the aperture or objective which transmits the light. For example, an optical system with a circular aperture ideally produces a diffraction pattern comprising an intense center spot surrounded by spaced-apart, concentric circular light rings of radially decreasing intensity. However, a rectangular aperture produces a diffraction pattern having a central spot which forms the intersection for four perpendicularly disposed spikes created by spaced-apart spots of outwardly decreasing intensity. A narrow slit aperture forms a diffraction pattern having a center band straddled by symmetrically spaced parallel energy bands of decreasing intensity. The present invention has recognized that ideal diffraction patterns having intense central spots can be more closely realized where mirror distortions, if any, are constrained to contours which resemble the diffraction pattern contours for the aperture being utilized.

An ideal mirror i.e. hydraulic cushion support would be realized by supporting evenly the whole support area of the mirror. However, this introduces significant practical difficulties which have not been overcome. Some of these difficulties could be overcome by resolving an area support into many concentric ring lines. Unfortunately, this cannot be practically realized with sufficient precision. For this reason, a mirror ring support has to be broken up and provided by many discrete support points, by many separate support elements.

Although total elimination of mirror surface deflection is practically not possible with known techniques, allowing the surface to deform to produce an almost ideal light diffraction pattern minimizes the harmful effects of distortion and optimizes image quality.

Another feature of this invention is the provision of an optical mirror support system of the above-featured type wherein the optical aperture has the shape of a closed plane curve and the deformation pattern formed on the mirror surface comprises a plurality of spaced-apart, concentric deformations having projected forms of closed plane curves. This particular arrangement relates to the many types of optical instruments having apertures with the shapes of closed plane curves such as ellipses or circles.

Another feature of this invention is the provision of an optical mirror support system of the above-featured type wherein the optical aperture is circular and the deformations form concentric circles. This particular mirror surface deformation pattern is especially well suited for use in the many optical instruments having circular apertures.

Another feature of this invention is the provision of an optical mirror support system of the above-featured type wherein the mirror is mounted on a plurality of support elements which engage discrete contact regions on the rear surface of the mirror. By locating the support elements such that lines joining most closely adjacent contact regions describe a plurality of annularly uniform, nonintersecting and substantially concentric geometric curves, the mirror surface deformation patterns suitable for use in the above systems are created.

Another feature of this invention is the provision of an optical mirror support system of the above-featured type wherein the plurality of discrete support pads contacting the support surface of the mirror have different shape and size (for example, round, elliptical, oblong, etc.) forming contact points, areas, regions or zones, and thus approaching the effect of a line support in a different way.

Another feature of this invention is the provision of an optical mirror support system of the above-featured type wherein the geometric curves are concentric with the optical axis of the reflective mirror surface. This results in a surface deformation pattern which is desirably symmetrical about the system's optical axis.

Another feature of this invention is the provision of an optical mirror support system of the above-featured type wherein the most closely adjacent contact zones lie on a family of circles concentric with the optical axis of the mirror surface. This arrangement of mirror supports is uniquely suited for use with an optical system having a circular mirror and circular input aperture.

Another feature of this invention is the provision of an optical mirror support system of the above-featured type wherein the radial spacing between adjacent circles connecting most closely adjacent contact regions is greater than the spacing between the most closely adjacent contact regions. The maintenance of these spacing relationships prevents the creation of radial deflections in the mirror surface which would cause harmful distortion of a circularly symmetrical diffraction pattern.

BRIEF DESCRIPTION OF THE DRAWINGS

These and other features and objects of the present invention will become apparent upon a perusal of the following specification taken in conjunction with the accompanying drawings wherein.

DESCRIPTION OF THE PREFERRED EMBODIMENT

Figure 1:
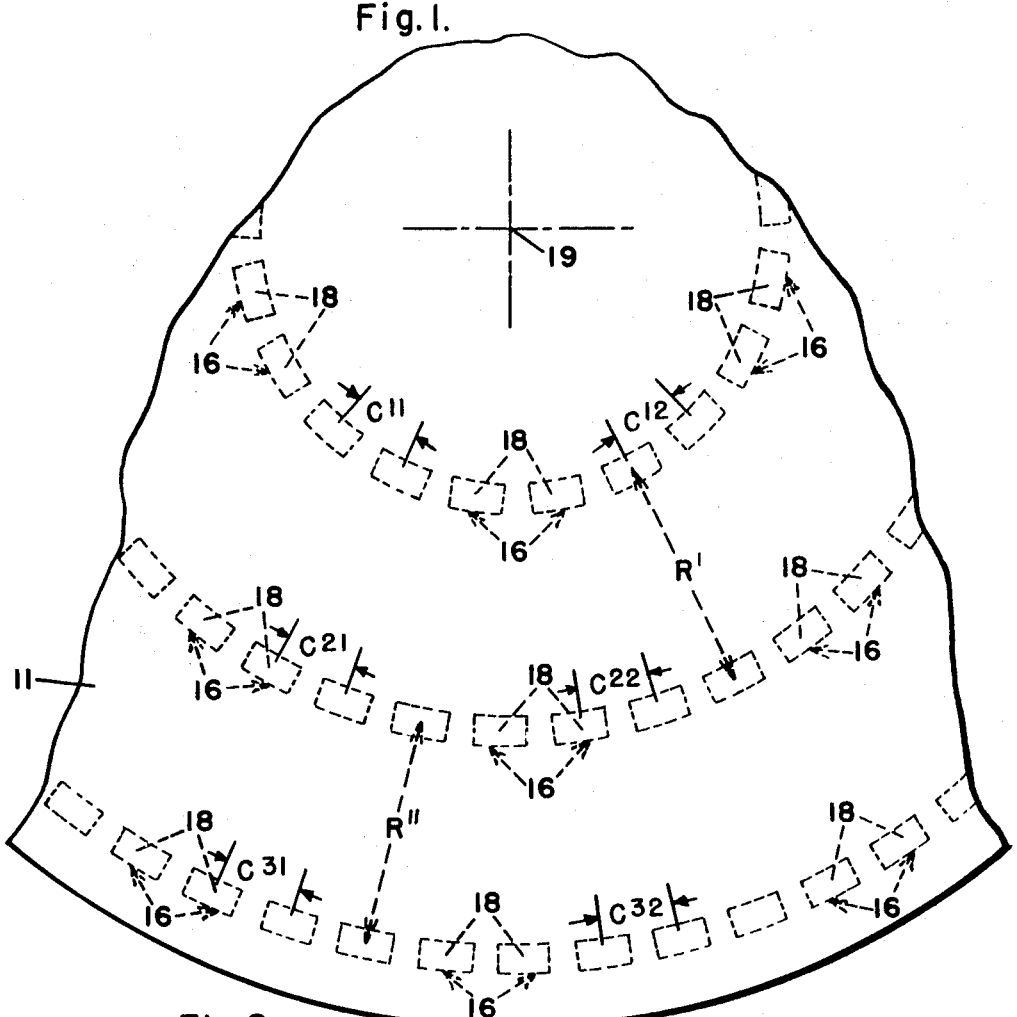
FIG. 1 is a partial cutaway plan view of a mirror which may be of the concave-imaging or plane-deflecting type and illustrating a plurality of mirror support points.
Figure 4:
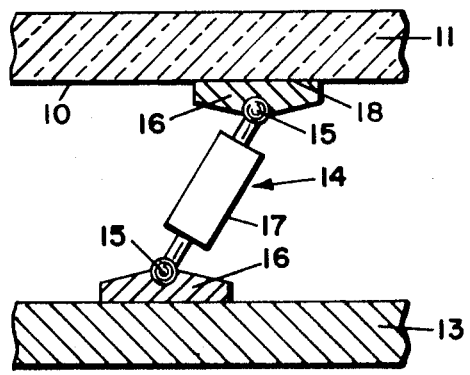
FIG. 4 is an elevational view, partly in section, illustrating in detail a support element which is positioned between the mirror and the backplate.

With reference to the FIGS. 1 and 4, there is shown the distribution arrangement of a plurality of contact regions 18 on a support surface 10. An upper ball joint 15 and a pad 16 of a support element 14, having a positionable element 17, engage a backplate 13 and the rear support surface 10 of the mirror 11 at the contact region 18. As previously pointed out, the support elements 14 deform the reflective surface so as to produce a symmetrical deformation pattern which yields an idealized diffraction pattern. The positionable elements 17 may be electromechanical screw-type, piezoelectric devices, or other suitable actuators well known in the art. In the example illustrated, it will be noted that the contact regions 18 lie along a family of circles which are concentric with the optical axis 19 of the mirror 11. It will be understood that the "family of circles" may generally be described as a "family of ellipses," the circle being a special case of the ellipse. The FIG. 1 is shown as a circle and it will be readily understood that this disclosure is intended to encompass elliptical, rectangular, etc., apertures as well. Furthermore, the uniform spacing C between contact regions 18 in each of the concentric circles is less than the radial spacing R between adjacent circles. Since surface deflections tend to parallel lines joining most closely adjacent points of stress, the forces exerted by the support elements 14 produce on the mirror surface 11, concentric circular deformations substantially coincident with the circular paths containing the discrete contact regions 18.

Figure 3:
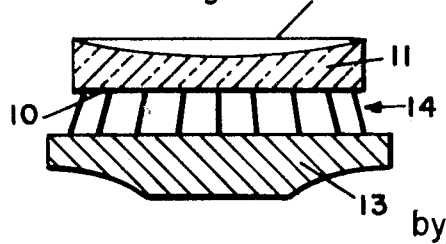
FIG. 3 illustrates a sectional view of the mirror and the planar backplate held in position by a plurality of schematically illustrated support elements.

The FIG. 3 illustrates the mirror 11 supported by a plurality of schematically shown support elements 14 from the backplate 13. One of the support elements 14 is shown in detail in the FIG. 4.

Figure 2:
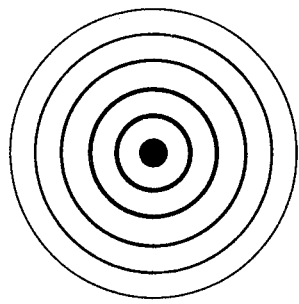
FIG. 2 illustrates a diffraction pattern negative created by an ideal circular optical aperture.

FIG. 2 illustrates a typical negative of a light diffraction pattern which would be produce on the mirror 11 by a light beam transmitted through the circular aperture 12 in FIG. 3. As shown, the pattern includes a high-intensity central spot and a plurality of spaced-apart, concentric rings. The qualitative similarity between the concentric image detail of the diffraction pattern caused by the optical aperture 12 and the concentric deformations produced on the surface of the mirror 11 by the preferred arrangement of the support elements 14 is obvious. It has been discovered that an arrangement which results in a qualitative similarity between an expected symmetrical diffraction pattern with a predetermined mirror surface deformation pattern minimizes harmful image distortion and thereby improves image quality.

The particular arrangement of the contact regions 18 shown in FIG. 1 is an important facet of the invention in that the deformation patterns created are directly dependent upon the relative positions of the contact regions. For example, it will be observed that lines joining most closely adjacent of the contact regions 18 describe a plurality of geometric polygons which are concentric with the optical axis 19. Because of the relatively small spacing between the contact regions along these polygons, the deformations created thereby approach the desired concentric circular pattern. However, upon a reduction of the radial spacing R to less than that of the circumferential spacing C, lines joining most closely adjacent of the contact regions 18 would possess radial components. The resultant radial components in the mirror surface deformation pattern would disrupt the concentric circular symmetry and prevent a qualitative match with the diffraction pattern shown in FIG. 2. Consequently, the reproduced diffraction image would exhibit a much higher degree of harmful distortion. Preferably the distances R between circles is about 1.5 times the distance C between adjacent contact regions in each circle to improve the formation of concentric deflections and not of radial ones. However, it is to be understood that this distance can vary between 1.1 and 2.

Figure 5A:
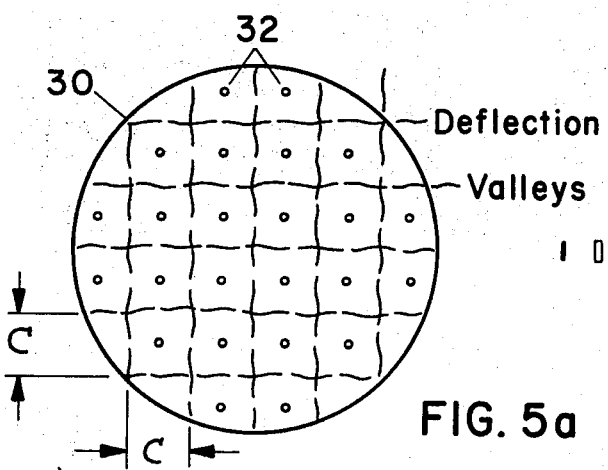
FIGS. 5a and 5b illustrate a rectangular support arrangement and the resulting diffraction pattern negative.
Figure 5B:
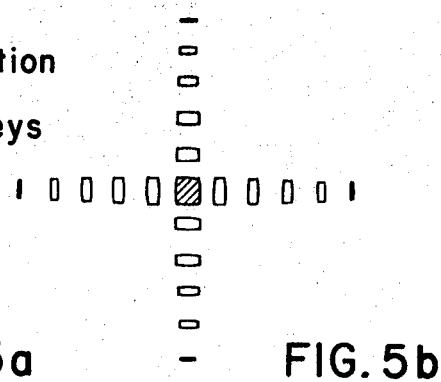

The FIG. 5a illustrates a mirror surface 30 wherein a plurality of support points 32 are arranged in a rectangular pattern. This arrangement produces deflections which cause an undesirable diffraction pattern as shown in the negative of FIG. 5b.

Figure 6A:
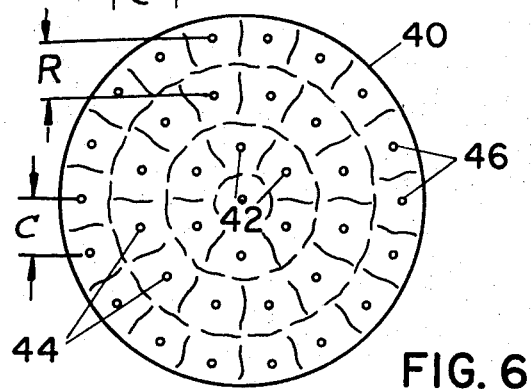
FIGS. 6a and 6b show a circular support arrangement wherein the distances between support points of adjacent elements on the same circle and the distance between adjacent elements of two adjacent circles, are equal and the resulting diffraction pattern negative.

Similarly, the FIG. 6a shows a mirror surface 40 wherein a plurality of support points 42, 44, and 46 are arranged along concentric circles (from smaller to larger, respectively). The distance R is the distance from the most adjacent support points 42 and 44 or 44 and 46. The distance C is the distance between adjacent support elements, 42, 44, or 46, of the same family of elements on the same circle. Again by the caused undesirable mirror deflection, an inferior diffraction pattern is produced such as that illustrated in the negative of FIG. 6b.

Figure 7A:
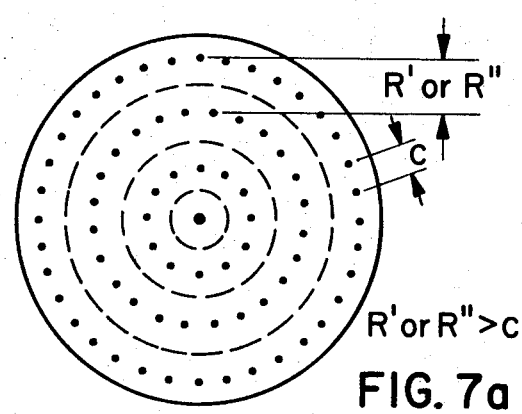
FIGS. 7a and 7b disclose, in a view somewhat similar to the FIGS. 1 and 2, the optimal arrangement of support points and resulting diffraction negative as taught by this invention.
Figure 7B:
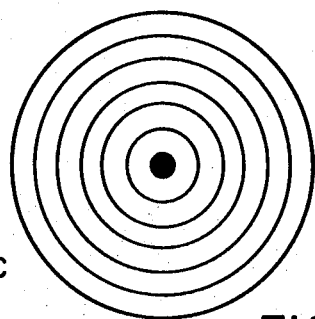

It is well known by those skilled in the art that the deflection D of a mirror 70 as shown in the FIG. 7 is proportional to the cube of the length L between support points. Thus, the deflection D between the support points 72 and 74 is proportional to the length L between the support points 72 and 74.

From this we can construct a table of relationships between R, C and the deflection resulting as the ratio of R to C is varied:

TABLE

Figure 8:
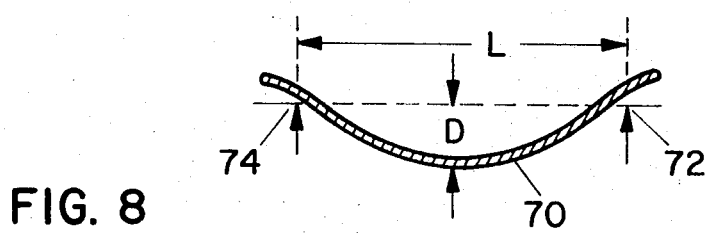
FIG. 8 illustrates a section of a mirror and how it departs (greatly exaggerated) from a plane surface.

SEE FIGURE 8a

| R/C | $(R/C)^3$ |
|---|---|
| 1.0 | 1.0 |
| 1.1 | 1.3 |
| 1.3 | 2.2 |
| 1.5 | 3.4 |
| 2.0 | 8.0 |

Figure 6B:
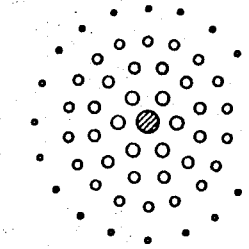

From the table it is derived that an R/C of 2.0 yields an ideal diffraction pattern as shown in the FIG. 8b whereas an R/C of 1.0 would exhibit an inferior diffraction pattern such as that shown in the FIGS. 5b or 6b. An R/C ratio that is a good trade-off but still yields a desirable diffraction pattern is that around 1.5. Furthermore, it is mechanically possible to construct a mirror having this many supporting elements.

Although the support element arrangement shown in FIG. 1 is preferred for the many optical systems utilizing circular apertures, it will be appreciated that other arrangements can be utilized advantageously in systems employing other aperture configurations. For example, with elliptical apertures, the positions of the contact regions 18 could be modified so as to lie along a family of ellipses related with the optical aperture 12. Similarly, when using rectangularly shaped apertures, one could employ a support arrangement which would form a mirror surface deformation pattern parallel to the mirror edges (this means parallel to the aperture outlines) which extend symmetrically from the optical axis 19. Such a deformation pattern would qualitatively match the diffraction pattern produced by a rectangular aperture. Similar deformation pattern matches could be produced for still other types of diffraction patterns.

Obviously, many modifications and variations of the present invention are possible in light of the above teachings. It is, therefore, to be understood that within the scope of the appended claims the invention can be practiced otherwise than as specifically described. For example the configuration of the pad in engagement with the support surface of the mirror can take a form other than that shown. Also, the radial spacing or distance between adjacent families of contact regions may differ and the spacing or distance between adjacent contact regions of the same family of contact regions may differ. As previously set forth, the preferred ratio of R to C is about 1.5, the range of ratios being between 1.1 and 2.

What is claimed is:

1. In combination with a mirror having a rear support surface, an optical axis and an aperture; said mirror forming a reflective surface, a mirror support system comprising a plurality of support elements which engage contact regions on said support surface, said contact regions being so disposed that lines joining most closely adjacent contact regions describe a plurality of substantially uniform, nonintersecting and substantially concentric, proportionally spaced, geometrical, deformation patterns in the mirror surface, said deformation patterns caused by said mirror support elements qualitatively producing an optimized diffraction pattern, and wherein said plurality of support elements are arranged in a plurality of families about said optical axis of said mirror and the range of the ratio distances R between adjacent families of support elements to the distance C between adjacent support elements of the same family is approximately 1.1 to 2.

2. The combination as defined in claim 1 wherein said plurality of support elements are arranged in a plurality of families about the optical axis of said mirror and the radial spacing R between families of support elements are of different distances.

3. The combination as defined in claim 1 wherein the distance C between adjacent contact regions of support elements of the same family of contact regions are of different distances.

4. The combination as defined in claim 1 wherein said ratio of the distances R to C is approximately 1.5.

5. An optical mirror support system according to claim 1 wherein said mirror aperture is circular and said deformation patterns form concentric circles.

6. An optical mirror support system according to claim 1 wherein said mirror reflective surface is circular and the most closely adjacent contact regions lie on a family of circles concentric with the axis of said circular mirror surface.

7. An optical mirror support system according to claim 1 wherein said mirror reflective surface is elliptical and the most closely adjacent contact regions lie on a family of ellipses about the axis of said mirror surface.

8. In combination with a mirror having a rear support surface and an aperture, said mirror forming a mirror reflective surface, a mirror support system comprising a plurality of support elements which engage contact regions on said support surface, said contact regions being so disposed that lines joining most closely adjacent contact regions describe a plurality of deformation patterns in the mirror reflective surface, said deformation patterns caused by said mirror support elements qualitatively matching the idealized diffraction pattern produced by said mirror aperture and wherein said mirror reflective surface is circular and the most closely adjacent contact regions lie on a family of circles concentric with the axis of said circular mirror surface wherein the range of the ratio distances R between adjacent families of support elements to the distance C between adjacent support elements of the same family is approximately 1.1 to 2.

9. An optical mirror support system according to claim 8 wherein the radial spacing R between families of contact regions are of different distances.

10. An optical mirror support system according to claim 8 wherein the distance C between adjacent contact regions of the same family of contact regions are of different distances.

* * * * *